United States Patent Office 3,588,994
Patented June 29, 1971

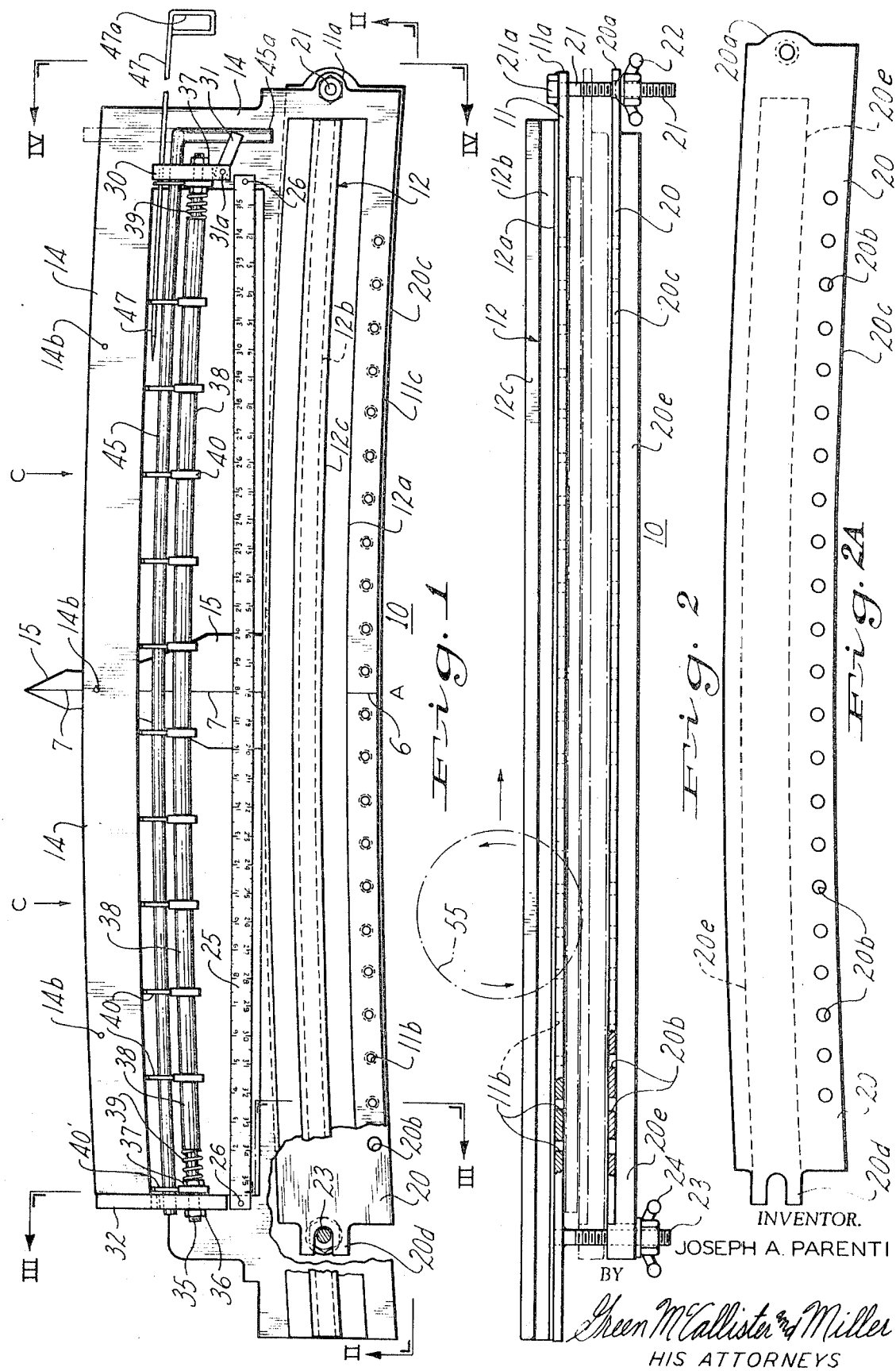

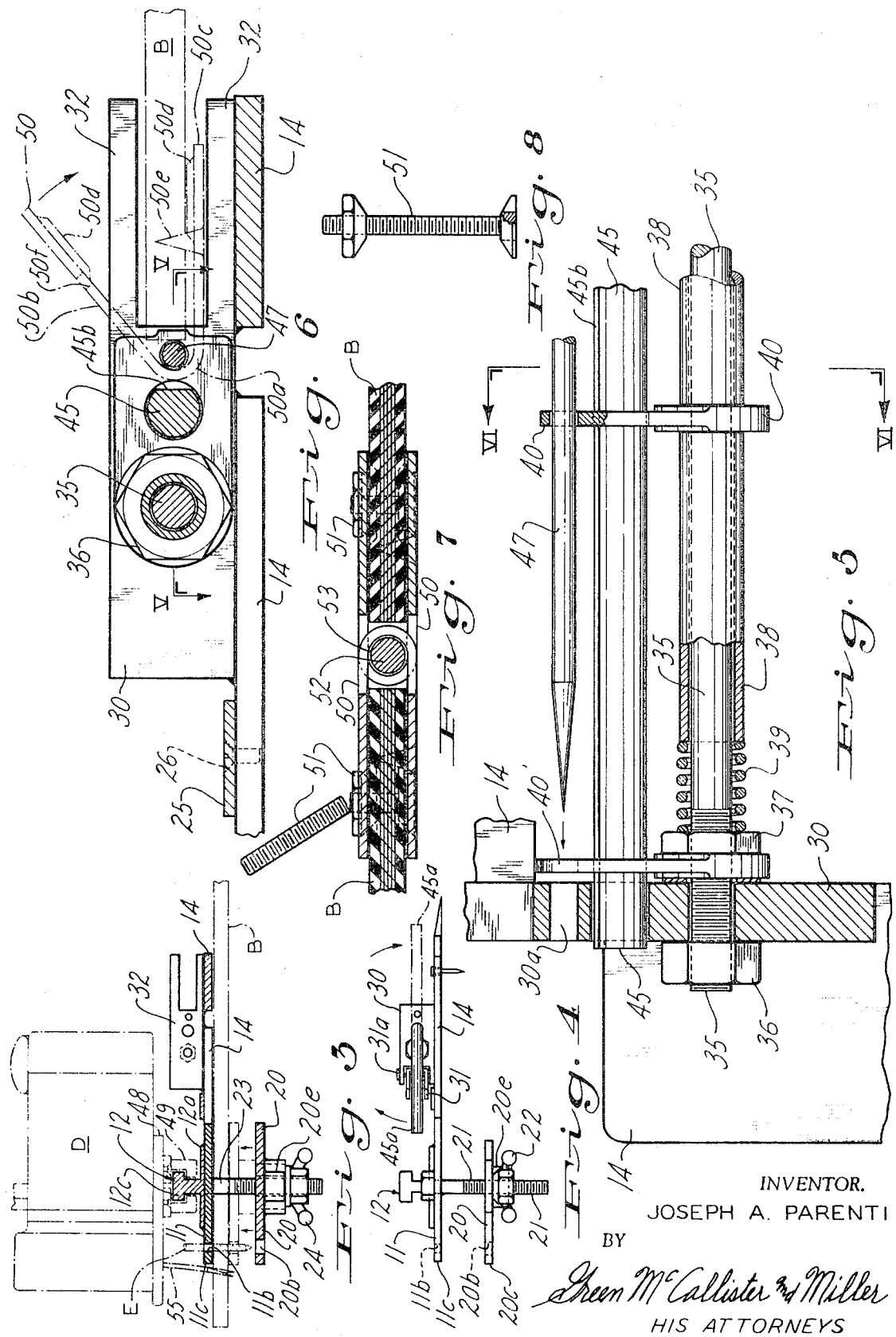

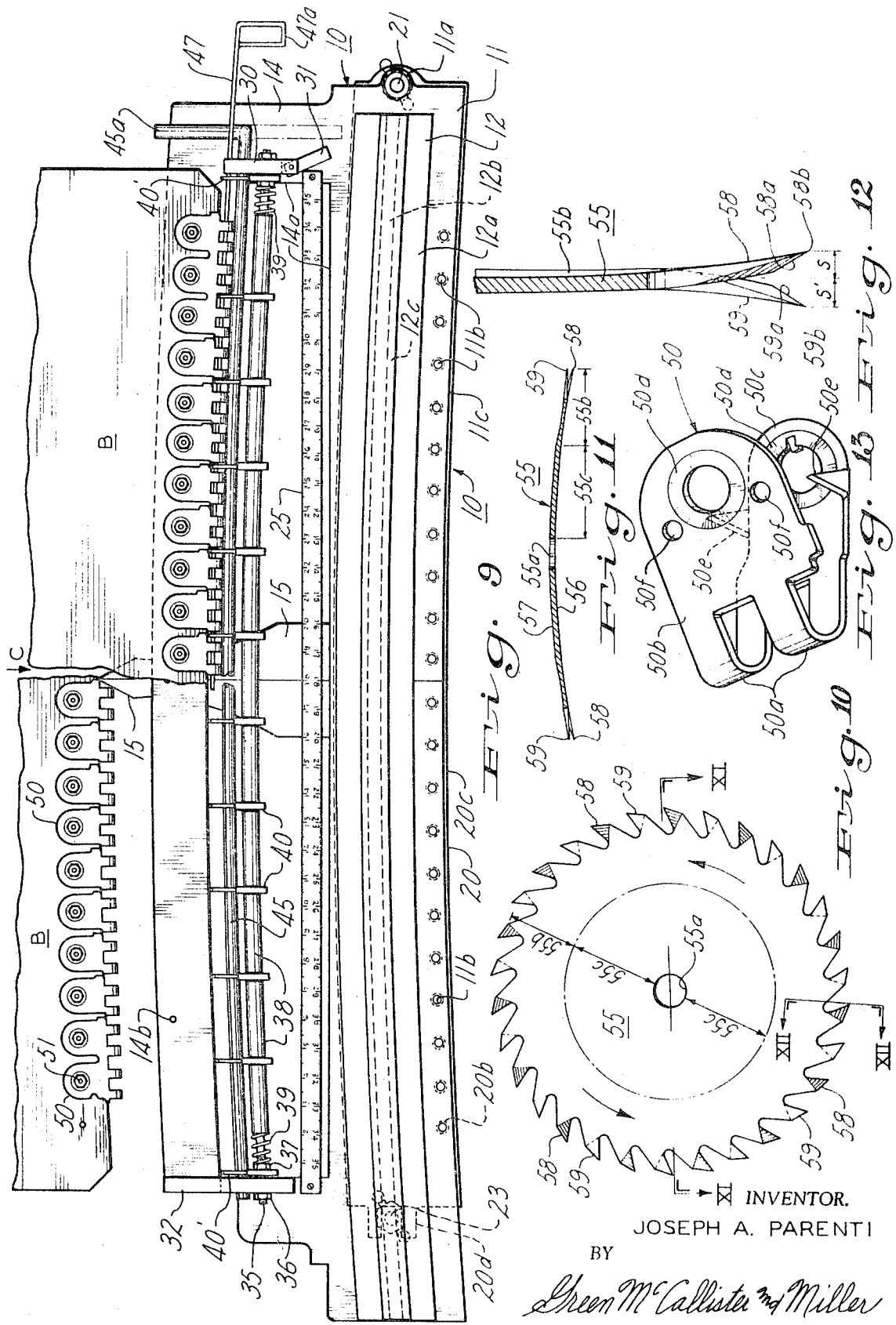

3,588,994
BELT PROCESSING MACHINE AND METHOD
Joseph A. Parenti, Rte. 7, Box 330,
Morgantown, W. Va. 26505
Filed Jan. 6, 1969, Ser. No. 789,193
Int. Cl. B23p *13/04, 19/00, 19/04*
U.S. Cl. 29—430
15 Claims

ABSTRACT OF THE DISCLOSURE

An end of a belt is inserted in a back end part of the frame of a processing machine and advanced towards its front end part where it is aligned and securely held while power cutting-off the end portion to provide a desired shaped of edge and while drilling spaced-apart hinge bracket mounting holes therealong. The drilled and cut-off end portion of the belt is then released and pulled backwardly towards the back end part of the machine, hinge brackets are positioned to extend over its cut-off edge and in alignment with its drilled holes, and bolt and nut assemblies are then inserted and started to loosely hold the brackets on the belt end portion. Finally, the brackets are flexibly-securely held within the back end part of the machine in an aligned position on the cut-off end portion of the belt and are secured in clamped-over positions on the end portion and over its cut-off edge. The operation is repeated for the other end portion of the belt and it is provided with hinge brackets that have a complementary fit with the hinge brackets on the other end portion of the belt. Hinge brackets of the opposite end portions are then connected by a hinge pin to form a continuous belt. A power saw blade having a special body and tooth construction is used for effectively cutting-off heavy resilient, fabric-like material represented by the thickness of a belt.

---

This invention is constructed and designed to solve a problem of long standing in the art of cutting a roll of belting to a suitable length and of accurately providing it with a requisite radius, shape or curvature along the edge of each end portion as cut, depending on the particular type of conveyor roller with which it is to be used. A phase of the invention deals with the drilling of suitable holes in and the accurate mounting of hinge brackets on a cut-off end portion of a belt. Another phase deals with the development of a rotary saw blade for quickly and efficiently cutting-off an end portion of a somewhat resilient, fabric-like material, such as represented by a conveyor belt.

It has been customary to cut-off and drill-out an end portion of a belt by nailing it on a wood platform or bed, using a T-square for aligning a guide thereon, and then manually drawing a sharp knife along the guide to provide the cut-off edge with a contour approaching the desired connecting end contour. Then, suitable holes were drilled in the belt and hinge brackets were secured thereon by aligning the drilled holes with those in the belt; inserting nut and bolt assemblies and tightening them down. Belting comes in various thicknesses, including ⅝ to ¾ of an inch, and is made of a resin impregnated fabric or rubber and thus, requires considerable drawing force to effect a knife cutting operation. The knife has to be very sharp and its cutting edge has to be frequently renewed. The operation is dangerous to the person who is manually cutting the belt, as the knife is drawn towards the individual; there is always the danger of the knife blade slipping-off the edge of the guide strip and cutting the operator. On the whole, the operation is tedious, dangerous and time-consuming.

For the opposite transverse end portion of the belt, the operation is repeated and then the brackets, as bolted to each end of the belt, have their fingers inserted in a complementary manner with respect to each other to effect a hinged relation. A hinge pin is then inserted to join cooperating knuckle ends of the brackets along opposed cut-off edges of the belt to mount the belt for conveying operations on a roller assembly.

It will be apparent that belts of this type are used for many applications, not only in the field of coal mining, but also in connection with the conveying of concrete and the handling and conveying of articles of manufacture, shapes, etc., in a metal fabricating or other type of plant. However, for the purpose of illustration, particular reference will be made to a conveyor belt installation such as used in coal mining.

In a coal mining operation, continuous mining machines usually operate in a group of two or three adjacent spaced-apart corridors that are joined by a common cross-connecting corridor of the mine. The coal is delivered in each corridor from a mining machine to a hood and then onto a continuous belt of a conveyor. When this belt becomes worn out or damaged and has to be replaced, a roll of the belting material in a main portion of the mine is then unrolled to a requisite length and the cutting and bracket-securing operation is then accomplished. The completed belt is then taken into the area where the old belt is to be replaced and mounted in position. It is usual to do the belt cutting-off, hole drilling and bracket-mounting operations in the main part of the mine and to then install the belt at the specific location of the conveyor.

In the drawings, FIG. 1 is a top plan view of a belt processing machine, device or apparatus constructed in accordance with the invention; a left-hand portion of the machine is broken away to show a particular feature of an under-positioned clamping member;

FIG. 2 is a front end view in elevation on the scale of and taken along the line II—II of FIG. 1; a left-hand portion of the machine is sectioned to illustrate details of its construction;

FIG. 2A is a top plan view on the scale of FIGS. 1 and 2 showing details of the construction of a bottom clamping member of the machine shown in FIGS. 1 and 2;

FIG. 3 is an end section in elevation on the scale of and taken along line III—III of FIG. 1; in this figure, a power saw and a drill stem are shown in broken lines to illustrate steps in the processing of an end portion of a conveyor belt;

FIG. 4 is an opposite end view on the scale of and taken along the line IV—IV of FIG. 1;

FIG. 5 is a greatly enlarged fragmental planar view that is partially in section and taken from the left-hand rear portion of the machine that is shown in FIGS. 1 and 9;

FIG. 6 is a fragmental end view in elevation and partial section on the scale of FIG. 5 and taken along the back portion of the machine from the right-hand side of FIGS. 1 and 9;

FIG. 7 is a side section in elevation on the scale of FIGS. 5 and 6 illustrating the connecting of cut-off and drilled end portions of a belt utilizing hinge brackets and a cross-extending hinge pin;

FIG. 8 is a vertical view in elevation on the scale of FIG. 7 illustrating bolt and nut assemblies that may be employed for securing hinge brackets on end portions of the belt;

FIG. 9 is a top plan view on the scale of FIG. 1, but particularly illustrating final steps in processing an end portion of a belt to mount and secure hinge brackets thereon;

FIGS. 10, 11 and 12 show a rotary cutting or saw blade constructed for cutting-off resilient matrial such as a belt;

FIG. 10 is a side view in elevation of the cutting blade and FIG. 11 is a horizontal section on the scale of and taken along line XI—XI of FIG. 10;

FIG. 12 is a greatly enlarged fragmental section taken along the line XII—XII of FIG. 10 and particularly illustrating the construction of cutting teeth and a hollow ground area of the blade;

And, FIG. 13 is a perspective view in elevation on the scale of FIG. 9 showing details of the construction of hinge brackets that are applied to the cut-off and drilled end portion of a belt.

Operations in accordance with the invention will first be described. And end portion of a conveyor belt B is introduced beneath a back end part 14 of a cross-extending support frame of a processing machine 10 in the direction of arrows C of FIGS. 1 and 9 and advanced forwardly towards and underneath and slightly forwardly of a front end part 11 thereof. Following this, the back part of the machine 10 may be secured, as by driving nails through the belt into a suitable support bed or table by inserting them through holes 14b in the back end frame part 14 of the cross-extending metal support frame of the machine. The front end frame part 11 is integrally connected with the back end frame part 14 and defines a front clamping assembly with a cross-extending clamping member 20 or plate of strip-like metal construction. The clamping member 20 is adjustably-secured by threaded stem and nut means 21, 22 and 23, 24 from an underside of the front frame part 11.

A T-square is not needed for aligning the belt B, in that a cross-extending measuring member, stick or ruler 25 is centrally mounted on the machine by machine screws 26 and has graduations numbered 1 through 35 (for up to a 36-inch width of belt) from right to left along one edge and of the same numbering from left to right along its opposite edge. Graduations on the measuring member 25 may thus be read from either the back or the front of the machine. Also, a center guide line 6 is formed on the front frame part 11 and a center guide line 7 is formed on an under-positioned, backwardly-extending, reinforcing part or member 15 of the frame of the machine 10. Thus, the belt B can be accurately aligned along the front of the machine, represented by A, and securely clamped in such position between the parts or members 11 and 20. Both the front frame part 11 and the clamping member or part 20 have respective front edge portions 11c and 20c that are shaped or curved generally to correspond to the desired curvature of the cut-off edge of the end portion of the belt B, and each has a series or plurality of transversely spaced-apart, through-extending drill-bypassing, respective hole portions 11b and 20b. The hole portions 11b, as shown particularly in FIGS. 2 and 3, are preferably of a relatively smaller diameter to somewhat accurately closely bypass and guide a twist drill stem E (see FIG. 3) that may be rotatably operated by a shaft of a conventional electric motor driven drill or impact tool (not shown).

The front frame part 11 mounts a cross-extending, T-shaped track or guide rail member 12 along its upper side or face which serves as a guide for endwise sliding movement of, for example, an electric motor-driven power saw unit D (see FIG. 3). The motor should drive a rotary, disc-like saw blade 55 at a relatively high speed of, for example, 4800 to 5000 r.p.m. As shown, the unit D has a bottom support plate 48 and a U-shaped slide guide sleeve, channel or shoe assembly 49 carried by the plate 48 to slidably-move endwise along the rail 12 and thus, transversely across the width of the belt B. A specially designed and constructed saw blade 55 is employed to cut-off the inner edge of the belt B along the front part of the machine 10, and the front edge portions 11c and 20c of the clamping parts, as guided by the shaped curvature of the guide rail 12. For a conventional type of roller-driven belt conveyor construction such as used in coal mines, the guide rail 12 is provided with a curvilinear, concave contour. In a 36-inch width of belt, a maximum central-backward offset from a straight edge of about 11/16 of an inch is satisfactory.

After a cutting-off has been accomplished and the saw unit D has been removed endwise from the track 12, a motor driven unit in the nature of a conventional drill or impact tool (not shown) which carries drill stem E is then used at the front end of the machine 10 to drill holes along the cut-off end portion of the belt b in the manner illustrated in FIG. 3. In this connection, it will be noted that the holes 20b in the clamping member 20 serve to bypass or receive the end of the drill stem E after it has passed through the thickness of the belt B and thus, have a slightly enlarged diameter with respect to the drill stem E and with respect to the diameter of the guide holes 11b in the frame part 11. Holes may be drilled progressively in the belt B from one end towards an opposite end of the machine 10 or, if the volume of work is sufficient, may be drilled simultaneously by the use of a plurality of simultaneously-introduced and operated drill stems.

After the above operation has been completed in forming one end portion of the belt B, the clamped relationship between the parts 11 and 20 is released by loosening thumb nuts 22 and 24 on threaded bolt-like stems 21 and 23 whose head or upper end portions are welded to and project downwardly from the underside of the front frame part 11. Upon such release and the withdrawing of nails or bolts out of the holes 14b in the back frame part 14, the end portion of the belt B may then be drawn backwardly within the machine 10 in the direction away from the front represented by A, opposite to the direction of arrows C, until the cut-off end portion rests on the back frame part 14. At this time, metal hinge brackets, such as 50, are applied to the cut-off end portion of the belt B. As shown particularly in FIG. 13, the brackets 50 have bent connecting shoulder ro knuckle portions 50a, top and bottom faces or leaves 50b and 50c, reinforced bolt-receiving hole portions 50d in the leaves, pairs of spaced-apart spike portions 50e on the bottom leaves 50c and aligned bypassing holes 50f in the top leaves 50b.

The brackets 50 which may, as shown, have several (such as three) connected parts or one part, depending on the width of the belt, etc., are then manually placed in alignment with holes in the cut-off end portion of the belt. The bolts of nut and bolt assemblies 51 are manually inserted within the holes 50d and through aligned holes in the belt B and their nuts are started to loosely hold the brackets 50 on the belt. At this time, the end portion of the belt B with the brackets thereon is advanced in the direction of the arrows C upon and forwardly of the back part 14 and a clamping rod 45 is turned by its handle 45a to the position of FIGS. 6 and 9, at which its offset planar side face 45b clears opposed knuckle portions 50a of the hinge brackets. An alignment pin rod 45 having handle 47a is then inserted endwise along the line of brackets 50 behind or inside their knuckle portions 50a and in an opposed relation with respect to the clamping rod 45. The handle 45a is turned from the position of FIGS. 6 and 9 to the position of FIG. 1, whereby the main or projecting surface of the body of the rod 45 will tightly engage the outside of the knuckle portions 50a and tightly clamp them in an aligned position against and along the inside extending alignment rod 47. At this time, a conventional impact wrench (not shown) may then be applied to the nut and bolt assemblies 51 to tighten them down and thus move the upper leaves 50b of the brackets 50 downwardly into a tight, belt-abutting and cooperating clamping relation with the bottom leaves 50c. At the same time, the projections 50e pass through-aligned holes 50f to form a completed assembly, such as illustrated on the right hand side of FIG. 7 and in FIG. 9. As illustrated to the left of FIG. 7, a projecting portion of the threaded stem of each assembly 51 may be sheared or cut-off to form completed end portions of the belt.

The above-descibed operation is then repeated for the opposite end portion of the belt and a metal hinge pin or rod 52 may then be inserted between complementary and interfitting knuckle portions 50a of opposed hinge brackets 50 in the manner shown in FIG. 7. The rod 52 is preferably given an adherent coating 53 of a suitable resin or plastic (such as nylon) so as to provide a suitable bearing fit for the knuckles 50a of the hinge brackets that form slight-inwardly offset or depressed hinge guide portions in the resin 53 along the rod 52.

Referring particularly to FIGS. 1, 2 and 2A, the cross-extending front clamping member 20 is shown as provided at its opposite ends with mounting lugs 20c and 20d through which bolts 21 and 23 are adapted to extend. The lug 20a has a closed opening or hole therein while the lug 20d has an open end or slot opening therein to give it more flexibility as to its suspended mounting from the front frame member 11. Also, the clamping member 20 has a downwardly projecting and lengthwise extending stiffener or rib portion 20e along its underside which terminates adjacent the mounting lugs 20a and 20d.

The slide guide rail or track member 12, as shown in FIGS. 1, 2 and 3 and 9, has a relatively wide bottom flange 12a that is secured on the upper face of the front frame part 11, a connecting web portion 12b and a relatively thickened top flange 12c. The flange 12c with the web 12b defines an accurate guide rail for endwise movement of the saw unit D therealong during the cutting off of an end portion of the belt B. The back frame part 14 on the machine is shown integrally connected to the front frame part 11 along opposite sides of the machine to define a centrally-extending open window portion 14a (see FIG. 9) across which the measuring member 25 and the rods 45 and 47 are adapted to extend.

A pair of upwardly-projecting end stands or mounts 30 and 32 extend along the back frame part 14 and are rigidly secured thereon. They not only have openings therethrough for bypassing the clamping rod 45 and the alignment rod 47, but also for receiving and bypassing a cross-extending tie rod or pin 35. As shown particularly in FIGS. 1, 9 and 5, a series of transversely spaced-apart and backwardly-extending hinge bracket aligning fingers 40 are at their front ends pivotally mounted on the tie rod 35. A backwardly projecting portion of each finger has additional hole portions therein for bypassing the clamping rod 45, as well as the alignment rod 47. Fingers 40' are provided adjacent opposite ends of the tie rod 35 and along with the tie rod are securely held in a mounted position on the end mounts or stands 30 and 32 by cooperating outer and inner nuts 36 and 37 that are tightened-down on threaded ends of the rod 35. On the other hand, the other fingers 40 have a somewhat flexible or resilient slide mounting on the rod 35; they are positioned between the ends of pairs of adjacent slide sleeves 38. Spiral tension springs 39 are positioned endwise on the rod 35 adjacent its opposite ends to, at their inner ends abut against the end of an adjacent slide sleeve 38. As a result, the pair of springs 39 permits the fingers 40 to be somewhat flexibly introduced in spaces between knuckle portions 50a of the hinge brackets 50 to flexibly align them transversely along the machine and thus, on the end portion of the belt B to which they are to be secured.

Referring to FIGS. 3 and 6, the end mount 32 is shown provided at its back end portion with an open, slotted or bifurcated construction to bypass and limit the introduction of an end portion of the belt B that is being introduced on the back frame part 14 in the direction of the arrows C with hinge brackets 50 thereon for completing its processing. As previously indicated, the belt B is initially inserted or advanced in the direction of the arrows C under the back frame part 14 and the front frame part 11 to extend sufficiently beyond the front edges 11c and 20c for a good cutting off or sawing operation. Preliminary to the second part of the operation, the belt B is drawn backwardly out of the machine 10 and hinge brackets 50 are loosely mounted thereon. The end mount or stand 30 is, as shown in FIGS. 1, 4 and 9, provided with a forked or bifurcated latch 31 that is pivotally-mounted thereon by a pin 31a to swing into and out of latching engagement with the handle portion 45a of the clamping rod 45 when the latter has been moved or turned into a latching position (see FIG. 1) with respect to the hinge brackets 50 in accomplishing the second part of the belt end processing.

Referring to FIGS. 10, 11 and 12, a problem had to be solved from the standpoint of providing a saw blade which could be motor driven for quickly and efficiently cutting-off end portions of the conveyor belt B. In view of the resilient, relatively thick, fabric-like nature of the material of the belt, no conventional saw blade was available which would work satisfactorily. A representative of one companying that makes and sells rotary power saws, recommended that the teeth should be as fine as possible, but this was tried and found to be totally impractical, in that the blade not only burned up the belt material without providing a suitable cutting action, but tended to greatly overheat itself such that its temper was lost. In evaluating the matter, it was determined that there had to be a special type of cutting action which would overcome the resilient closing-in action of such a material, that would provide relief for the cut portions, and that would cut in such a manner as to avoid any unevenness due to the bunching-up of the material.

In the first place, it was found necessary to use a relatively large tooth construction with relatively wide peripheral spacing therebetween, and to provide adjacent teeth along the periphery of the cutting edge with an inclination towards opposite sides of the plane of the blade body. See the right and left sets S and S' of FIG. 12 which defines a relatively wide cutting band that is greater than the thickness of any section of the body of blade 55 beyond another peripheral area representing its alternative teeth 58 and 59. Also, it was found that the blade 55 should have a hollow ground area or banding portion 55b immediately adjacent the tooth area, and should preferably have somewhat of a concave shape along an outer face or side 56 and a convex shape or curvature along its opposite or inner side or face 57. The blade 55 fully meets all requirements and is the first power operated blade which has been found to be successful for such a cutting-off operation, thus eliminating the necessity for using a draw knife.

The blade 55 shown in FIGS. 10 and 12 is adapted to accomplish its cutting action by rotary movement counterclockwise when its mounting hole portion 55a is secured on the power shaft of a driving motor, such as D of FIG. 3, using a drive speed in the neighborhood of 4800 to 5000 r.p.m. A belt of 36" in width and about 11/16" in thickness has been accurately cut within a period of about twelve to nineteen seconds using a blade 55 constructed in accordance with the invention. The disc-like body of the blade 55 is of a somewhat dished shape along its outer face 56 that has a maximum radius of about 3/32 to 1/8 of an inch. Inner and outer teeth 58 and 59 are turned about 10° to 15° outwardly to provide about 1/16 of an inch cut that approximates the cutting action of two adjacent knives. Inner peripheral banding area 55c may, as shown, be of substantially uniform thickness between the mounting hole portion 55a and hollow ground peripheral banding area 55b. The hollow ground area 55b is intermediate the teeth and the inner peripheral area 55a and has a slightly reduced thickness.

Referring particularly to FIGS. 10 and 12, the blade 55 has alternate inner and outer teeth 58 and 59 that are inclined or tilted away or outwardly from a central axis of the shaped body and oppositely with respect to each other. The tilt or twist of each tooth provides a clearance spacing between them. Each inner face having the 10° to 15° angle is represented by 58a and 59a for each respective tooth 58 and 59, and terminates in a sharpened point or end portion 58b and 59b. It has been found advisable to provide teeth 58 and 59 of a depth or extent at least equal to the thickness or depth of the fabric material being cut. Also, the teeth 58 and 59 and the hollow ground area 55b should preferably be quench hardened.

Although the machine 10 has been constructed particularly for processing conveyor belts, it may also be used for cutting-off as well as drilling other plastic or fabric-like material, such as for the hood of a conveyor, etc. In this connection, the width or transverse extent of the machine may be lengthened, with the front edges 11c and 20c being made straight edges and the guide rail 20 being provided with a fully straight extent. It will also be apparent to those skilled in the art that various changes, additions, modifications and subtractions may be made in the illustrated apparatus without departing from the spirit and scope of the invention.

I claim:

1. In a belt processing machine for a resilient belt-like material such as used for a continuous conveyor, a cross-extending support frame having front and back belt receiving parts, clamping means operatively associated with said front part for securing an end portion of the belt on and in an aligned position with respect thereto, operating means cooperating with said front part for cutting-off the end portion of the belt and for drilling holes in the end portion while the end portion is being held in a clamped position with respect to said front part, and guide means carried by said front part and cooperating with said operating means to accurately guide said operating means in its cutting-off and drilling operations.

2. In a belt processing machine as defined in claim 1, said guide means including a guide rail extending transversely along and mounted on said front part, and said operating means including a slide sleeve for movement along said guide rail.

3. In a belt processing machine as defined in claim 1, said guide means including a series of transversely spaced-apart holes along said front part of a size substantially corresponding to the size of holes to be formed in the end portion of the belt.

4. In a belt processing machine as defined in claim 3, said clamping means having a series of transversely spaced-part hole portions therealong in an aligned relation with respect to the hole portions of said front part and of enlarged diameter with respect thereto, said clamping means being adapted to clamp the end portions of the belt between it and an underside of said front part, and said operating means including drill stem means adapted to be inserted within the hole portions of said front part for downward movement through the end portion of the belt int the hole portions of said clamping means.

5. In a belt processing machine as defined in claim 1, said guide means including cooperating front guide edges along said front part and said clamping means of a curvilinear shape corresponding to a desired shape of cut-off of the end portion of the belt, and said operating means including a saw blade for guided cutting movement along the cooperating front guide edges of said front part and said clamping means.

6. In a belt processing machine as defined in claim 5, said guide means including a guide rail extending transversely along an upper side of said front frame part, and said operating means including a power saw having a slide sleeve for guided movement along said guide rail.

7. In a belt processing machine as defined in claim 1, said clamping means constituting a transversely-extending strip-like clamping member, said front frame part carries a pair of downwardly-projecting threaded bolts at its opposite transverse ends, and said strip-like clamping member having an eyelet at one end and an open-end slot at its opposite end for receiving said bolts, and nut means for cooperating with said bolts to removably secure the end portion of the belt between an underside of said front part and an upper face of said clamping member.

8. In a belt processing machine as defined in claim 7, a graduated scale extending transversely of said frame in a substantially central position between said front and back parts thereof for aligning an end portion of the belt in its positioning on the machine.

9. In a belt processing machine wherein hinge brackets are to be mounted along a cut-off end portion of a flexible belt, a cross-extending support frame having front and back belt receiving frame parts, aligning-clamping means extending transversely across and in a cooperative relation on said back frame part for securely positioning the hinge brackets in an aligned position with respect to the cut-off end portion of the belt, while the hinge brackets are being secured on the cut-off end portion of the belt in alignment with the holes therein.

10. In a belt processing machine as defined in claim 9, a pair of end mounts projecting from said back part, said aligning-clamping means constituting a tie rod extending across between said pair of end mounts, a series of sleeve parts positioned in a slidable relation on and along said tie rod, a series of alignment fingers each being slidably mounted on said tie rod between an adjacent pair of said sleeves, resilient means on said tie rod cooperating with said sleeves for normally urging said sleeves into tight abutment with said fingers along the extent of said tie rod, and said fingers having a transverse spacing between each other and extending backwardly from said tie rod to engage with and align the hinge brackets along the cut-off end portion of the belt.

11. In a belt processing machine as defined in claim 10, wherein said hinge brackets have opposed clamping leaves connected by knuckle portions, a cross-extending clamping rod operatively positioned within said pair of end mounts and extending through openings in said fingers, said clamping rod having a handle portion for turning it within said pair of mounts and having a flattened face therealong for bypassing the knuckle portions of the hinge brackets when the cut-off end portion of the belt is being positioned on said back frame, said clamping rod being adapted to be turned by said handle portion to move a projecting face into tight engagement with an outer side of the knuckle portions of the hinge brackets for securely holding them in position with respect to the end portions of the belt, an alignment pin adapted to extend through said pair of end mounts and along an inner side of the knuckle portions of the hinge brackets and cooperating with said clamping rod for holding the hinge brackets in position on the cut-off end portion of the belt while bolt and nut assemblies are being tightened-down to secure the brackets on the end portion of the belt.

12. In a processing machine as defined in claim 11, latch means pivotally carried by one of said end mounts and adapted to engage said handle portion of said clamping rod for holding it in tight engagement with the knuckle portions of the hinge brackets during the securing of the hinge brackets on the end portion of the belt.

13. In a belt processing machine as defined in claim 1, a saw blade for cutting-off the end portion of the belt while it is secured in an aligned position with respect to said front part, said guide means including means for guiding said saw blade along the end portion of the belt while it is secured in position with respect to said front part, said saw blade having a body provided with a series of relatively widely spaced-apart teeth along its outer peripheral edge, each adjacent tooth of said body being tilted towards an opposite side face of said body to define a relatively wide cutting band, and a hollow ground band along said body within an area immediately adjacent said teeth.

14. In a method of preparing end portions of a conveyor belt for pivotally-connecting them together with hinge brackets and a hinge pin to provide a continuous belt, aligning and securely holding each end portion of the belt while advancing a rotating saw blade thereacross in an accurately guided relation to form a slightly concave edge therealong, continuing to securely hold the end portion in an aligned position while drilling-out a series of transversely spaced-apart hinge bracket mounting holes therealong adjacent the cut-off edge thereof, releasing the cut-off and drilled end portion, providing bendable hinge brackets having opposed and spaced-apart top and bottom leaves with aligned hole portions therethrough that are connected by a knuckle joint, loosely-positioning the hinge brackets on each cut-off and drilled end portion of the belt with their knuckle joints extending about the cut-off edge and with the hole portions of their opposed leaves in alignment with mounting holes in the belt, securely holding the loosely-positioned brackets in alignment on each end portion of the belt, and then moving their opposed leaves into clamping engagement with the belt and securing them thereon with bolt and nut assemblies.

15. In a belt processing machine as defined in claim 9, clamping means operatively associated with said front part for securing an end portion of the belt on and in an aligned position with respect thereto, operating means cooperating with said front part for cutting-off the end portion of the belt and for drilling holes in the end portion while the end portion is being held in a clamped position with respect to said front part, and guide means carried by said front part and cooperating with said operating means to accurately guide said operating means in its cutting-off and drilling operations.

References Cited

UNITED STATES PATENTS

| | | | |
|---|---|---|---|
| 2,256,428 | 9/1941 | Green | 29—417 |
| 2,970,372 | 2/1961 | Berman | 29—417X |
| 3,195,228 | 7/1965 | Beacham | 29—200X |
| 3,262,194 | 7/1966 | Fady | 29—417X |

THOMAS H. EAGER, Primary Examiner

U.S. Cl. X.R.

29—33, 200, 417, 526, 558, 567

PO-1050
(5/69)

UNITED STATES PATENT OFFICE
CERTIFICATE OF CORRECTION

Patent No. 3,588,994          Dated June 29, 1971

Inventor(s) Joseph A. Parenti

It is certified that error appears in the above-identified patent and that said Letters Patent are hereby corrected as shown below:

Column 4, line 38, change "ro" to --or--; line 56, after "pin" insert --or--.

Column 5, line 11, change "slight-" to --slightly---.

Column 6, line 50, change "FIGS. 10 and 12" to read --FIGS. 10 to 12--.

Column 7, last line of claim 4, change "int" to --into--.

Signed and sealed this 30th day of November 1971.

(SEAL)
Attest:

EDWARD M. FLETCHER, JR.      ROBERT GOTTSCHALK
Attesting Officer              Acting Commissioner of Patents